Patented Feb. 13, 1945

2,369,465

UNITED STATES PATENT OFFICE 2,369,465

PREPARATION OF ANTIANEMIC PRODUCTS

Havard L. Keil, Clarendon Hills, Ill., assignor to Armour and Company, Chicago, Ill., a corporation of Illinois No Drawing. Application September 14, 1942, Serial No. 458,337

4 Claims. (Cl. 167—74)

This invention relates to processes of separating anti-anemic principles, or so-called "activity" from animal tissue material, such as liver, containing the same.

It is conventional, in this art, to admix the tissue material with water to obtain an aqueous extract of the water soluble anti-anemic activity together with other water soluble constituents in the tissue. Such water extracts are then concentrated to pastes or syrups. Thereafter the anti-anemic activity is transferred to aqueous alcohol along with impurities soluble therein.

One of the major problems in this art has been the purification of the aqueous pastes or syrups, or the relatively dilute alcoholic solutions of anti-anemic principles, in order to free them of impurities associated therewith and thus obtain anti-anemic materials of high activity. In my Patent 2,125,844 I describe advantageous ways of separating impurities from extracts containing the anti-anemic principles. In the present invention I improve on the processes of the aforesaid patent. Final products of the improved process are purified to a higher degree and are freed of substances hitherto considered unavoidable impurities in anti-anemic preparations.

The present invention is directed to a series of process steps which follow the conventional procedures of extracting animal tissue materials with water in the usual way, and transferring the substances extracted to aqueous alcohol solutions having strengths of about 60 to 80 percent, usually about 70 percent. Such aqueous alcohol solutions are well known in the art, and it is these solutions which are, by the steps of the present invention, further treated for the elimination of impurities associated with the anti-anemic principles therein.

In the practice of my invention I may first prepare an aqueous methyl or ethyl alcohol extract of the water soluble constituents of animal liver, or other animal tissue material such as stomachs, and which contains anti-anemic principles. These extracts can be made by admixing the tissue with hot water, draining the liquids from the undissolved solids, and concentrating the liquid portions thus obtained to a paste or syrup. To the syrup enough alcohol, either methyl or ethyl, and usually of 95 percent strength, may be added so that the combined water in the syrup and alcohol present (having regard also for water in the added alcohol) will give an aqueous alcohol solution having a strength of about 70 percent. The resulting mixture is allowed to settle and the aqueous alcohol portions separated from undissolved materials. This alcohol solution contains the anti-anemic principles and those impurities associated therewith which are soluble in the 70 percent alcohol at room temperature.

I then depart from the teachings of the prior art by first chilling the 70 percent aqueous alcohol solution to a temperature of $-20°$ F. or below. This results in the precipitation of many of the impurities present and I chill as long as further precipitation occurs.

The anti-anemic principles remain in solution even at temperatures well below $-20°$ F. provided the strength of the aqueous alcohol solution is about 60 to 80 percent.

I next decant or otherwise separate the supernatant alcohol solution from the precipitate. The alcohol solution is then concentrated to about 70 percent total solids and to the concentrate I add absolute ethyl alcohol. This precipitates a paste-like mass of anti-anemic principles. The precipitate is then separated from supernatant liquid and the paste is extracted with absolute methyl alcohol. This dissolves the anti-anemic principles, now freed of a large portion of the impurities. Finally, the anti-anemic principles are precipitated from the methyl alcohol solution thereof at temperatures of $-20°$ F. or below. This precipitate has high potency and is freed of most all of the impurities originally present, including histamine and bile salts.

Thus the present invention is based on the precipitation of impurities under certain conditions of alcohol strength and temperature, the precipitation of anti-anemic activity by the use of absolute ethyl alcohol, and finally the precipitation of highly purified anti-anemic principles from 95 to 99 percent methyl alcohol solutions thereof at low temperatures. Temperatures, kind of alcohol, and strength thereof are thus coordinated to yield anti-anemic factors purified to a degree not hitherto achieved in this art.

I shall now give an example of how my invention can be practised.

The animal tissue, such as liver or stomachs, is first hashed and admixed with hot water. 3600 pounds of livers are, for example, ground and mixed with 7200 pounds of water and the mixture heated to a temperature of about 180° F. for about one-half hour. The liquid portions of the mixture are then drained off and concentrated to a syrup containing about 50% total solids. This is one of the ways of making ordinary aqueous liver pastes or syrups. To the syrup I then add, with stirring, enough methyl or ethyl alcohol to give an alcoholic concentration therein of 60% to 80%. 70% is the usual optimum value. Where I refer to alcoholic concentrations in the paste or syrup I mean that the water portion and the alcohol portion together give a solution which would have a strength of 60% to 80%. In adding alcohol to the syrup it is, therefore, important, as is well understood, that the amount of water in the syrup, and the actual strength of the added alcohol, be taken into account so that after the addition of the alcohol the strength of the aqueous alcohol is approximately 60% to 80%. The alcohol added can be the ordinary denatured ethyl alcohol of commerce which has a strength of about 95%, or it can be pure grain alcohol, or it can be methyl alcohol. In any event, enough is added so that the aqueous alcohol in the mixture is of the strength indicated.

As a result of this step I now have an aqueous alcohol mixture containing anti-anemic principles dissolved in the alcohol soluble impurities, and insoluble material. The mixture is allowed to settle and the supernatant aqueous alcohol pumped off. Then the solid residue is admixed with a further quantity of alcohol having a strength of 70% to "wash" the insoluble mass and thus free it of any occluded aqueous alcohol containing anti-anemic principles. The alcohol washings are, of course, added to the supernatant liquid obtained in the first separation step.

This aqueous alcohol solution is then held at a temperature of about —20° F. or below to cause the precipitation of material insoluble in this temperature. These solids precipitate in such condition that supernatant liquid can be pumped therefrom without any mechanical handling difficulties. The residue can be drained in canvas bags for the recovery of further quantities of aqueous alcohol. If desired, the residue can be washed with cold alcohol having a strength of about 70% in precisely the same manner as the first precipitate of solids was washed.

The aqueous alcohol solution is now concentrated in a vacuum still until it has a concentration of about 70 percent solid material. This step is simply to reduce the bulk of the liquids under treatment and also to reduce the quantity of absolute alcohol to be added. The concentrate at this stage is in the form of a syrup and to it about 5 to 6 volumes of absolute ethyl alcohol for each volume of syrup are added. This absolute alcohol takes up water in the syrup and thus "dehydrates" it whereupon the solids therein precipitate. The alcoholic liquid portions of the mixture are separated off.

The precipitate thus formed is next extracted with absolute methanol. Advantageously the extraction is performed with about three separate portions of methanol and the several extracts combined. The combined extracts are then chilled to —20° F. or below to precipitate the activity (anti-anemic factor) therein. The precipitate is dried in vacuo (after separation from the supernatant methyl alcohol) and this dried product is the final product in my process. It can be taken up in water for the preparation of solutions for administration.

Although the precipitated paste from the precipitation thereof with absolute ethyl alcohol is taken up in absolute methyl alcohol, there is sufficient moisture in the paste so that the activity is actually precipitated from a methyl alcohol solution having from about 1 to 5 percent water. That is to say, at a temperature of —20° F. or below the activity (anti-anemic principles) will precipitate from methyl alcohol solutions having a strength of 95 percent or higher.

Although I have described my process in its preferred form as a correlated series of process steps, I do not wish to be limited to such series in its entirety. It is new with me to dissolve a mixture composed of anti-anemic principles and impurities in methyl alcohol having a strength of at least 95 percent and thereafter chill the solution to —20° F. or below to precipitate the anti-anemic principles, leaving associated impurities in solution. This is a step in my process which can be utilized apart from any particular way of obtaining a mixture of anti-anemic principles and impurities, both of which are soluble in methyl alcohol of at least 95 percent strength.

The lower limits of chilling temperatures are well below —20° F. in both precipitation step in the cold. I can chill to as low as —30° F. or —40° F. but this is unnecessary. At —20° F. precipitation occurs as stated and I therefore find it sufficient to hold the solutions at this temperature.

Having thus described my invention what I claim is:

1. The process of freeing anti-anemic principles from impurities associated therewith, both of which are soluble in methyl alcohol having a strength of at least 95 percent, which comprises dissolving a mixture containing the anti-anemic principles and the said impurities in methyl alcohol having a strength of at least 95 percent, chilling the solution to at least —20° F., and separating the precipitated anti-anemic principles from the alcoholic solution of dissolved impurities.

2. The process of separating and purifying anti-anemic principles contained in animal tissue material which comprises the steps of extracting an aqueous mixture of the water soluble constituents of such tissue with aqueous alcohol to obtain an extract of such constituents in aqueous alcohol having a strength of 60 to 80 percent, adding absolute ethyl alcohol thereto to precipitate the anti-anemic principles and impurities insoluble in the thus-formed strong alcohol solution, separating the precipitated solids from the alcohol solution, admixing the precipitate with absolute methyl alcohol to dissolve the anti-anemic principles and such impurities associated therewith as are soluble in the resulting strong methyl alcohol solution, chilling the methyl alcohol solution to a temperature of at least —20° F., and separating the thus precipitated anti-anemic principles from the methyl alcohol solution of dissolved impurities.

3. The process of separating and purifying anti-anemic principles contained in animal tissue material which comprises the steps of extracting an aqueous mixture of the water soluble constituents of such tissues with aqueous alcohol to obtain an extract of such constituents in aqueous alcohol having a strength of 60 to 80 percent, chilling to at least —20° F. to precipitate impurities, separating the precipitate from the alcoholic solution, adding absolute ethyl alcohol to said alcoholic solution to precipitate the anti-anemic principles and impurities insoluble in the thus-formed strong alcohol solution, separating the precipitated solids from the alcohol solution, admixing the precipitate with absolute methyl alcohol to dissolve the anti-anemic principles and such impurities associated therewith as are soluble in the resulting strong methyl acohol solution, chilling the methyl alcohol solution to a temperature of at least —20° F., and separating the thus precipitated anti-anemic principles from the methyl alcohol solution of dissolved impurities.

4. The process of separating and purifying anti-anemic principles contained in animal liver which comprises the steps of extracting an aqueous mixture of the water-soluble constituents of such liver with aqueous alcohol to obtain an extract of such constituents in aqueous alcohol having a strength of 60 to 80 percent, chilling to at least —20° F. to precipitate impurities, separating the precipitate from the alcoholic solution, concentrating said solution, adding absolute ethyl alcohol to the concentrated solution to precipitate the anti-anemic principles and impurities insoluble in the thus-formed strong alcohol solution, separating the precipitated solids from the alcohol solution, admixing the precipitate with absolute methyl alcohol to dissolve the anti-anemic principles and such impurities associated therewith as are soluble in the resulting strong methyl alcohol solution, chilling the methyl alcohol solution to a temperature of at least —20° F., and separating the thus precipitated anti-anemic principles from the methyl alcohol solution of dissolved impurities.

HAVARD L. KEIL.